(12) United States Patent
Loguinov

(10) Patent No.: US 7,206,285 B2
(45) Date of Patent: Apr. 17, 2007

(54) METHOD FOR SUPPORTING NON-LINEAR, HIGHLY SCALABLE INCREASE-DECREASE CONGESTION CONTROL SCHEME

(75) Inventor: Dmitri Loguinov, Wappingers Falls, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 979 days.

(21) Appl. No.: 09/923,868

(22) Filed: Aug. 6, 2001

(65) Prior Publication Data

US 2003/0026207 A1 Feb. 6, 2003

(51) Int. Cl.
- H04J 1/16 (2006.01)
- H04J 3/14 (2006.01)
- H04L 1/00 (2006.01)
- H04L 12/26 (2006.01)

(52) U.S. Cl. ............... 370/235; 370/229; 370/230.1; 370/232

(58) Field of Classification Search ......... 370/229, 370/230, 230.1, 232, 233, 234, 235, 236, 370/237

See application file for complete search history.

(56) References Cited

U.S. PATENT DOCUMENTS

| | | | | |
|---|---|---|---|---|
| 5,115,429 A | * | 5/1992 | Hluchyj et al. | 370/231 |
| 5,509,050 A | * | 4/1996 | Berland | 455/557 |
| 6,144,639 A | * | 11/2000 | Zhao et al. | 370/235 |
| 6,400,686 B1 | * | 6/2002 | Ghanwani et al. | 370/232 |
| 6,477,143 B1 | * | 11/2002 | Ginossar | 370/230 |
| 6,577,599 B1 | * | 6/2003 | Gupta et al. | 370/236 |
| 6,587,437 B1 | * | 7/2003 | Lee et al. | 370/236.1 |
| 6,826,151 B1 | * | 11/2004 | Li et al. | 370/230.1 |
| 6,839,321 B1 | * | 1/2005 | Chiruvolu | 370/230.1 |
| 6,839,768 B2 | * | 1/2005 | Ma et al. | 709/235 |
| 6,850,488 B1 | * | 2/2005 | Wesley et al. | 370/230 |
| 2002/0089931 A1 | * | 7/2002 | Takada et al. | 370/232 |
| 2002/0186657 A1 | * | 12/2002 | Jain et al. | 370/235 |

* cited by examiner

Primary Examiner—Chirag G. Shah
(74) Attorney, Agent, or Firm—Larry Liberchuk

(57) ABSTRACT

Disclosed is a method and system for controlling congestion control in a packet data communication network in which a plurality of data is transmitted from a source node to a destination node. Depending on the congestion state in the network, the sender rate at which the source node is transmitting the data is adjusted based on the congestion feedback information and the bandwidth capacity of the network. The adjustment of the sender rate is performed according to predetermined criteria to establish a maximum data transmission rate and maximum fairness for the source.

37 Claims, 2 Drawing Sheets

METHOD FOR SUPPORTING NON-LINEAR, HIGHLY SCALABLE INCREASE-DECREASE CONGESTION CONTROL SCHEME

BACKGROUND OF THE INVENTION

1. Field of the Invention

The present invention relates to digital packet transmissions, and particularly to a method and system for providing congestion control in a digitally switched packet communication network employing serial data transmission.

2. Description of the Invention

Traditional congestion control schemes are used to minimize the switch buffer requirements and enable users to have fair access to the available bandwidth. In particular, the congestion control serves to reduce the load on the network when the load becomes excessive and the packets become lost. Hence, the congestion control allows the network to recover from congestion and operate at an optimum load. Due to scalability issues, congestion control is usually implemented end-to-end, i.e., Internet source nodes performs congestion control dynamically based on the congestion status of the network.

In most Internet applications, a typical congestion control employs increase-decrease response functions to adjust the sending rate based on a binary congestion feedback and available bandwidth in the network. If the feedback information indicates that the capacity of the bottleneck link has been exceeded in the network, the congestion control applies the decrease function ($f_D$) to the current sending rate. Otherwise, the congestion control applies the increase function ($f_I$) to the current sending rate. In this scheme, the network load is kept at an optimal capacity by limiting the load on the network by properly adjusting the sending rates.

The following equation summarizes the increase-decrease congestion control schemes:

$$x_{i+1} = \begin{cases} x_i - f_D(x_i), & f > 0 \\ x_i + f_I(x_i), & f = 0. \end{cases} \quad (1)$$

The above equation (1) uses these symbols:

f=congestion feedback signal, wherein f is positive if congestion is present; otherwise, f is zero (in practice packet loss is typically used as feedback f);

$x_i$=current sending rate during cycle i, wherein the adjustment to the sending rate is made once per congestion control cycle, and a typical congestion control cycle length is one round-trip time (RTT);

$x_{i+1}$=next sending rate of data;

$f_D$=decrease function to the current sending rate; and, $f_I$=increase function to the current sending rate.

A prior art known as AIMD (Additive-Increase/Multiplicative-Decrease) scheme has both $f_I$ and $f_D$ as linear functions of the current rate $x_i$. The AIMD method is typically used in a TCP environment and defined as:

$$\begin{cases} f_D(x) = \beta x \\ f_I(x) = \alpha. \end{cases} \quad (2)$$

From the above equation (2), it can be inferred that the decrease step ($f_D$) in the AIMD method is multiplicative (or linear function by a factor for each RTT) and the increase step ($f_I$) is additive (or constant function for each RTT). The recommended value for $\beta$ and $\alpha$ is 0.5 and 1, respectively.

Another enhanced increase-decrease algorithm in the prior art, known as the binomial algorithms, is an extension of the above AIMD concept and defined as follows:

$$\begin{cases} f_D(x) = \beta x^l \\ f_I(x) = \alpha x^{-k}. \end{cases} \quad (3)$$

In practice, however, this binomial algorithm cannot be used for l>1, as the decrease step may result in a reduction of the sending rate to a negative value from any arbitrary state $x_i$. As a result, the use of the conventional binomial algorithms has been limited for the value of $l \leq 1$, and the recommended values of l and k have been limited to satisfy the condition of k+l=1. Special cases of binomial congestion control schemes above, known as the IIAD (Inverse Increase Additive Decrease) method, recommends setting k=1 and l=0, and another SQRT (Square Root) method recommends setting k=l=0.5. Furthermore, in all binomial schemes, k+l must be strictly above zero to converge to a fair state (i.e., fair link utilization). For background information, see for example, "Binomial Congestion Control Algorithms," IEEE InfoCom 2001, the content of which is hereby incorporated by reference.

Although there are different types of congestion control schemes available as stated above, no existing techniques are available that can effectively control the data flow between source and destination end systems such that congestion is controlled and the unused capacity is utilized while maintaining certain quality-of-service (QoS) guarantees. Accordingly, the present invention proposes a non-linear increase-decrease congestion control method using real-time estimates of the bottleneck bandwidth to achieve high flow scalability and maintain steady packet loss, which does not grow with an increase in the number of data flows sharing a common link.

SUMMARY OF THE INVENTION

The present invention is directed to a method and system for providing congestion control in a real-time streaming application between a source system and a destination system.

According to an aspect of the present invention, there is a method for providing a congestion control in a communications network. The method includes the steps of: transmitting a plurality of serial data transmission from a source node to a destination node; determining the bandwidth capacity of the network to determine whether a congestion state exists; adjusting the sender rate at which the source is currently transmitting the data according to the first predetermined criterion if no congestion occurs; and, adjusting the sender rate of the source according to a second predetermined criterion if congestion occurs. The first predetermined criterion includes increasing the number of packets transmitted by the source node, whereas the second predetermined criteria includes decreasing the number of packets transmitted by said source node. Any adjusting steps are performed to establish high flow scalability and maintain good fairness for the source nodes.

According to another aspect of the present invention, there is provided a system for providing congestion control in a communications network by adjusting the sender rate between at least one sender node and destination node. The system includes a means for transmitting a plurality of data transmission from one source node to the destination node; means for determining a bandwidth capacity of the network; means for generating congestion feedback information based on the bandwidth capacity of the network to determine a congestion state; and, means for adjusting the sender rate at which the source is currently transmitting the data based on the congestion feedback information and the bandwidth capacity of the network. If no congestion occurs, the system increases the number of packets transmitted by the source node at the first rate and at the second rate if a predetermined range of the bandwidth capacity of the network is utilized. If congestion occurs, the system decreases the number of packets transmitted by the source node at a predetermined rate.

These and other advantages will become apparent to those skilled in the art upon reading the following detailed description in conjunction with the accompanying drawings.

DETAILED DESCRIPTION OF THE PREFERRED EMBODIMENT

In the following description, for purposes of explanation rather than limitation, specific details are set forth such as the particular architecture, interfaces, techniques, etc., in order to provide a thorough understanding of the present invention. In addition, for purposes of clarity and simplicity detailed descriptions of well-known devices, circuits, and methods are omitted so as not to obscure the description of the present invention with unnecessary detail.

Figure 1:
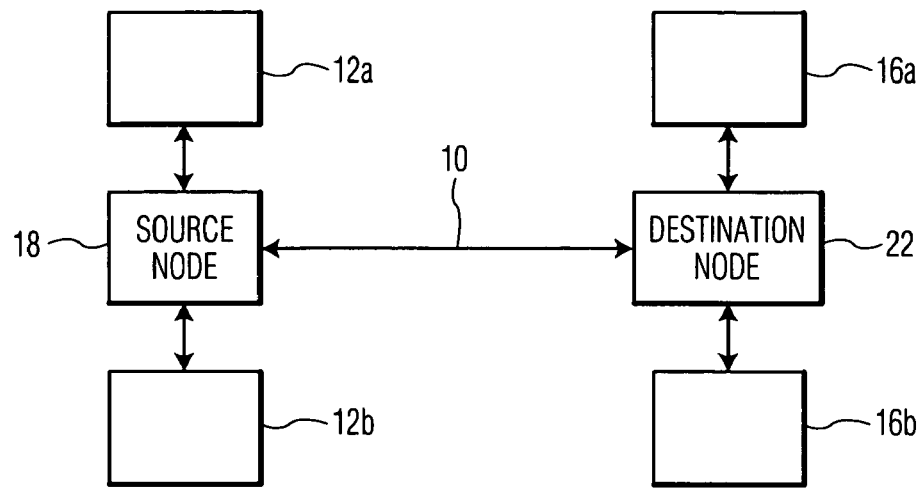
FIG. 1 is a representation of a data communication system that may utilize the congestion control scheme in accordance with the present invention.

Referring to FIG. 1, a packet data communication system for exchanging data packets is illustrated according to an exemplary embodiment of the present invention. The system includes a source node 18 and a destination node 22 coupled to each other via a communication link 10. The communication link 10 may be in the form of point-to-point links or a shared communication medium, i.e., token ring or Ethernet LAN. In addition, the communication link 10 may include a wireless link, wired link, satellite link, or long distance fiber optical link. A number of user nodes 12a–12n and 16a–16n are connected to the source node 18 and the destination node 22, respectively. Each node may include a work station, front end processor, bridge, router, or any processor-type device that is capable of transmitting and receiving data packets. It should be noted that the network shown in FIG. 1 is small for illustration purposes. In practice most networks would include a much larger number of host computers and network switching devices. Thus, the number of nodes in the drawing should not impose limitations on the scope of the invention.

Figure 2:
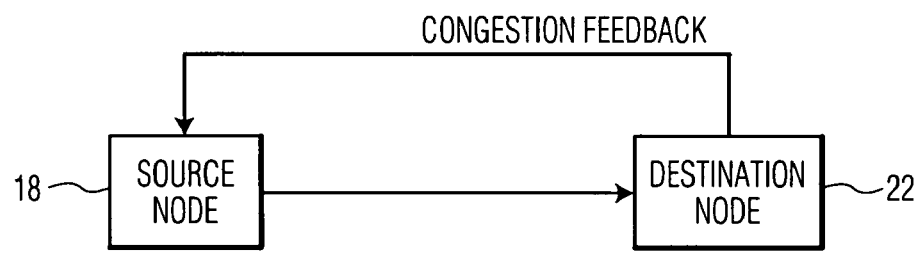
FIG. 2 is a simplified block diagram illustrating the source and destination end systems according to an embodiment of the present invention.

FIG. 2 illustrates an enhanced view of FIG. 1 demonstrating the embodiment of the present invention. The present invention provides congestion control for adjusting the packet transmission rates based on the congestion feedback information derived from receiver's (node 22) monitoring of the data flow and reporting packet loss to the sender in special packets. In operation, data packets generated by the source node 18 are transmitted to the intermediate node 20 then to the destination node 22. If the network experiences congestion as the traffic offered to the network exceeds the capacity of the network, the congestion condition is controlled to guarantee the quality of service (QoS) for each connection. Detecting the congestion state based on packet loss is well known in the art and can be performed in a variety of ways.

Figure 3:
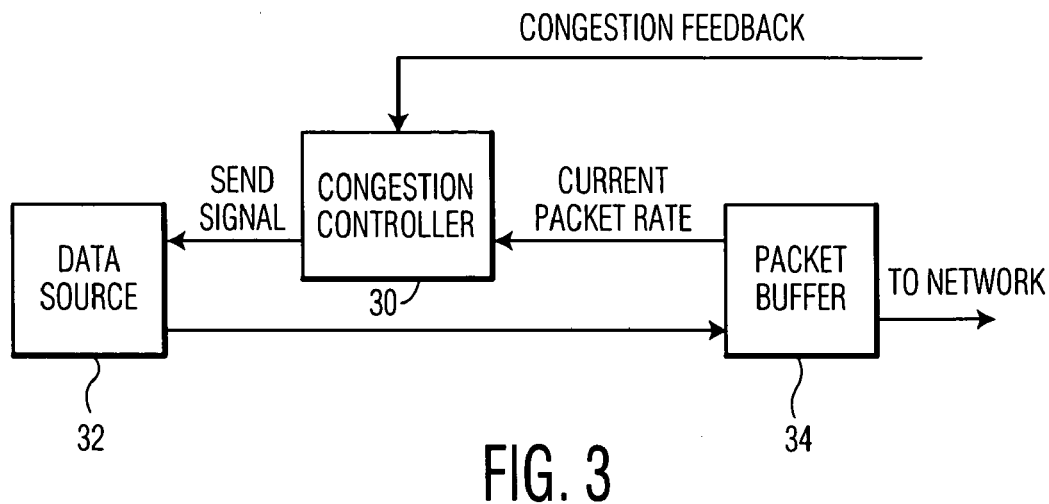
FIG. 3 is a simplified block diagram illustrating the functional elements of the system according an embodiment of the present invention.

FIG. 3 illustrates the functional block elements of the source node 18 that are capable of adjusting the sending rate according to the embodiment of the present invention. The source node 18 includes a data source 32, a congestion controller 30, and a data buffer 34. The congestion controller 30 schedules the transmission time of each datum into the network by transmitting a send signal to the data source 32 based on the receipt of the congestion feedback information and the current packet rate monitored by the packet buffer 34.

Figure 4:
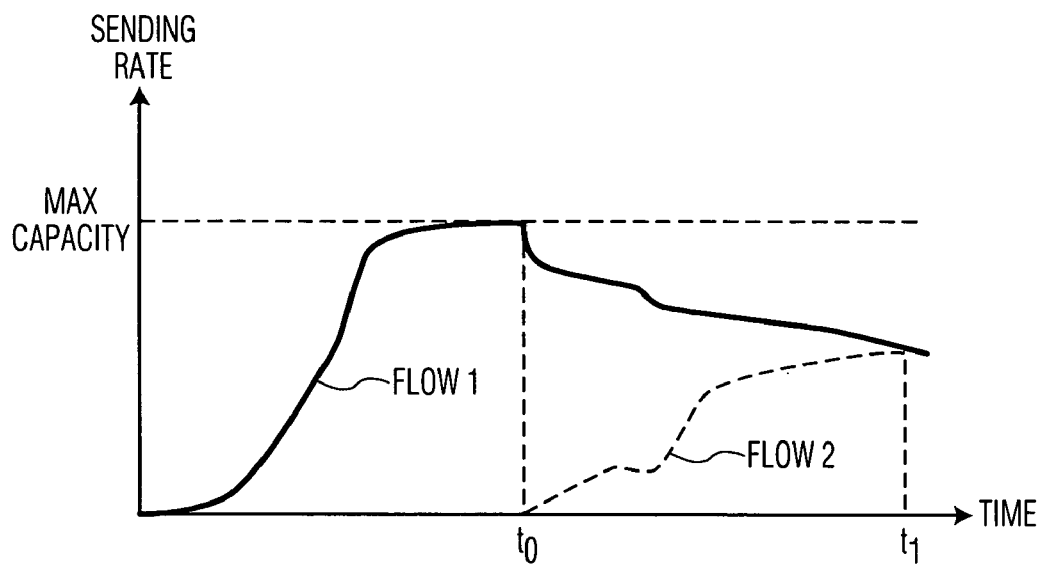
FIG. 4 is a graphic representation of bandwidth utilization according to an embodiment of the present invention; and, FIG. 5 is a flow chart illustrating the operation steps of providing congestion control according to an embodiment of the present invention.
Figure 5:
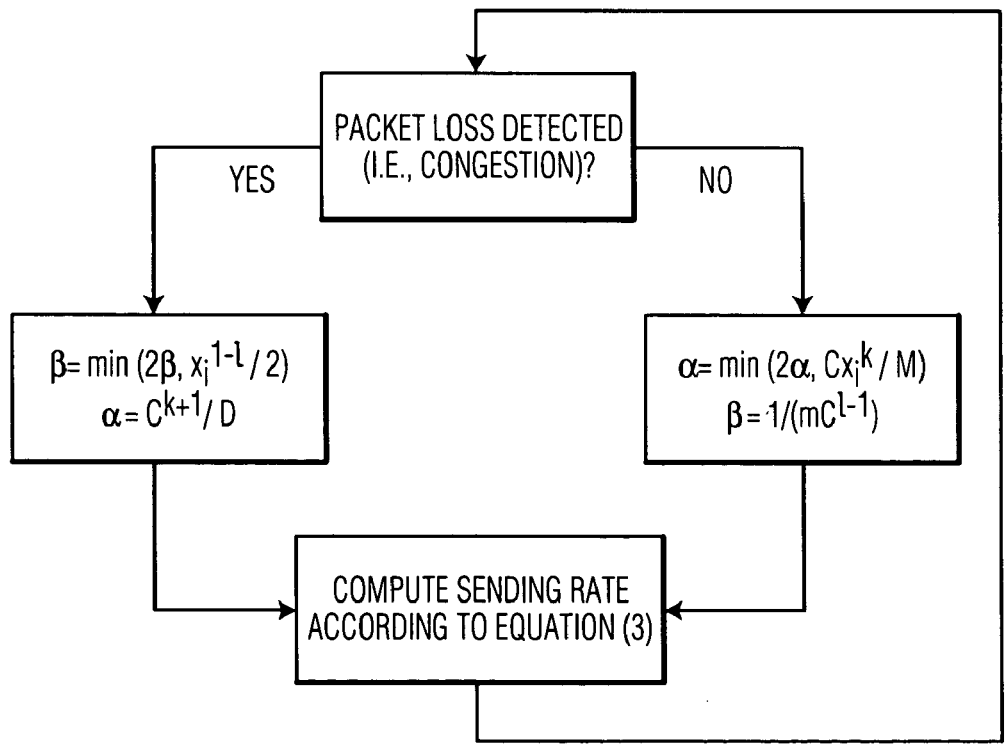

FIG. 4 illustrates the concept of fairness according to the present invention. Here, the y-axis represents the sending rate of a connection over a particular path. The bold curve is the sending rate of flow1, which starts at time 0. Flow2 is given by the dashed line, which starts at some time $t_0>0$. As shown in FIG. 4, the first flow at time $t_0$ occupies the entire capacity of the path, thus being unfair towards the second flow. Hence, "convergence to fairness" means that both flows will eventually maintain approximately the same sending rate equal to C/2, where C is the capacity. The time needed to converge to a fair state (i.e., $t_1-t_0$) is called "convergence speed," or simply "convergence." Consequently, it is desirable to have congestion control with high convergence speed. The present invention allows the use of such parameters in equation (3) that guarantee faster convergence to fairness than possible with the current methods. It is noted that this is just one of the benefits of using the present invention, whereas the second benefit is achieving higherflow scalability (i.e., ability to support a large number of simultaneous flows without adverse effects of high packet loss). Also, it is noted that both benefits may not always be possible at the same time (i.e., fast convergence and scalability are tradeoffs of each other).

Now, a detailed description of how the available bandwidth is shared fairly among all nodes while maintaining certain QoS guarantees (i.e., constant packet loss) in a given network is explained hereinafter. Prior to explaining the inventive method of adjusting the sender rate, some understanding of the background material is necessary.

Referring back to the equations (1) to (3) in the background section, it is offered that the conventional binomial algorithms cannot be used for l>1 for the decrease function. If any values of l<1 is used, it results in suboptimal convergence to fairness. However, if the decrease function of l>1 is used, the system can guarantee much quicker convergence to fairness. Thus, the use of l greater than 1 is provided in the present invention to reach the fairness faster. For example, a faster convergence may be achieved by setting l=2 and k=0 in the equation (3); however, the conventional method has been limited to the value of $l \leq 1$.

The second problem with the conventional method is poor scalability. Scalability refers to the ability of a scheme to support many concurrent flows without an increase in packet loss as the number of flows over a shared link n increases. Many analyses and experiments have shown that packet loss increases proportionately to $n^{l+2k+1}$ as the number of flows n increases. To achieve better scalability, the value of power, $l+2k+1$, must be small. The conventional AIMD methods have poor scalability, which is defined as $n^2$. Other prior art methods, IIAD (Inverse Increase Additive Decrease, i.e., k=1, l=0) and SQRT (i.e., l=k=0.5), have worse scalability of $n^3$ and $n^{2.5}$, respectively. A key aspect of the present invention is to obtain the value of $l+2k+1$ as close to 0 as possible. When the value of $l+2k+1$ falls below zero, the converge-to-fairness time becomes larger. Furthermore, an ideal congestion control method should strive to maintain constant (rather than decreasing) packet loss regardless of the number of users so that the network may guarantee a certain QoS.

In order to maintain constant packet loss (i.e., $l+2k+1=0$), the value of l must be strictly larger than 1. Recall that the condition for convergence is given by $k+l>0$, which combined with $l+2k+1=0$ translates to $-(l+1)/2+l>0$, or, $l>1$. In the present invention, it is necessary to use the value of $l>1$, and the value of k must be less than $-1$. Therefore, the following condition is necessary to achieve constant packet loss in a communication system.

$$\begin{cases} l > 1 \\ k < -1 \\ k + l > 0 \\ l + 2k + 1 = 0 \end{cases}$$

To enforce the above condition, the present invention utilizes real time bandwidth estimates C to allow the use of decrease power functions with constant packet loss scalability that was impossible in prior art schemes. To this end, the destination node 22 measures bottleneck bandwidth in real time using end-to-end methods. For every burst of packets (a burst is two or more packets transmitted by the sender back-to-back), the present invention obtains an estimate of the bottleneck capacity C, thus overcoming the impossibility of using values of l greater than 1. Estimating bottleneck bandwidth is well known in the art that can be performed in a variety of ways. See for example, U.S. Pat. Ser. No. 09/837,936 filed on Apr. 19, 2001 by the same Applicant, the contents of which are hereby incorporated by reference.

With continued reference to equations (1) and (3), and with the knowledge of the capacity of the bottleneck link C, the present invention uses the following the values of $\alpha$ and $\beta$ to adjust the packet rates:

$$\alpha = \frac{C^{k+1}}{D} \text{ and} \quad (4)$$

$$\beta = \frac{1}{mC^{l-1}}.$$

It is noted that the condition that the new rate will never fall below zero is satisfied by the above choice of constants in equation (4). This is due to the fact that rate $x_i$ is always limited by C. In the prior art system, the values of $\alpha$ and $\beta$ are fixed to 1 and 0.5, respectively. However, in the present embodiment, the equation (4) is selected to bind the value of $f_D(x_i)$ and $f_I(x_i)$ for all values of $x_i \leq C$. That is, the amount of increase $f_I(x_i)$ is no more than $x_i/D$ and the amount of decrease $f_D(x_i)$ is no more than $x/m$ for all rates $x_i$ below capacity C. Consequently, the new rate $x_{i+1}$ is no less than $x_i(1-1/m)$, which is always greater than zero.

The parameter m specifies how aggressive the decrease cycle should be and affects the behavior of the link's long-term utilization. It is noted that m must be at least 1, and that larger values of m may result in higher link utilization, but slower convergence to fairness. The parameter D specifies how aggressive congestion control should be during the increase phase and affects the amount of packet loss suffered by the flows on a shared link. Thus, larger values of D result in less packet loss but slower convergence to fairness. Accordingly, to find an optimal operating point, the recommended values are $2 \leq m \leq 8$ and $5 \leq D \leq 20$. Furthermore, the condition requirement of $k<-1$ and $l>1$ are necessary conditions for creating congestion control schemes with constant packet loss.

To improve the convergence characteristics of schemes with parameters shown in equation (4), the present invention proposes two additional methods as described below. It is noted that both methods are optional and can be used independently of each other.

To speed up convergence to fairness during the increase cycle, the scheme will double the value of $\alpha$ during each increase cycle. This will make the scheme progressively more aggressive as the increase steps will become larger and larger. This will expedite the schemes search for new bandwidth in cases when it takes long to fill the entire capacity of the bottleneck link. Each time the scheme suffers a packet loss and is forced to decrease the rate, the value of $\alpha$ is reset to the value shown in equation (4). In practice, this exponential increase of $\alpha$ must stop at some time, which is when the increase step $f_I(x_i)$ becomes more than a certain percentage of capacity C, i.e., C/M, where M is some constant greater than 1. In other words, $\alpha$ is doubled while this condition holds:

$$\alpha x_i^{-k} \leq C/M \quad (5),$$

wherein C is the capacity of the bottleneck link and M is constant (typically in the range of 10–100). In other words, the increase function $f_I$ will be doubled with each congestion cycle (i.e., once per RTT) until it reaches a certain value in the range between 1% and 10% of capacity C. After reaching a certain percentage (1–10%) of the bandwidth capacity, the increase function $f_I$ will be constant, i.e., $f(x_i)=C/M$. This constitutes a linear probing for new bandwidth and is equivalent to using increase power k=0. This condition is enforced by using the following computation of $\alpha$ for all increase cycles except the one following congestion (during the first increase cycle after congestion, the schemes uses equation (4)):

$$\alpha_{i+1} = \min(2\alpha_i, Cx_i^k/M).$$

The second improvement is applied to the decrease cycle of a scheme with constant packet loss scalability. To expedite the backoff (i.e., rate reduction) during congestion, the second proposed method doubles the value of $\beta$ after each decrease cycle. Note that once congestion is relieved, the value of $\beta$ is reset to its default value in equation (4). The same rules apply to doubling the value of $\beta$—do not allow the decrease step to become more aggressive than half of the current sending rate $x_i$, i.e., $f_D(x_i)$ should always be no more than $x_i/2$. Consequently, the following condition must be met for each decrease cycle (except the one right after congestion is detected for the first time):

$$\beta_{i+1} = \min(2\beta_i, x_i^{1-l}/2) \quad (6).$$

The previous description of the preferred embodiments is provided to enable any person skilled in the art to make or use the present invention. The various modifications to these embodiments will be readily apparent to those skilled in the art, as well as other embodiments, without the use of the inventive faculty. Thus, the present invention is not intended to be limited to the embodiments shown herein but is to be accorded the widest scope consistent with the principles and novel features disclosed herein.

What is claimed is:

1. A method for providing congestion control in a communications network, the method comprising the steps of:
   (a) transmitting a plurality of serial data transmission from a source node to a destination node;
   (b) determining whether a congestion occurs in said network;
   (c) determining a bandwidth capacity of said network;
   (d) adjusting a sender rate at which said source is currently transmitting the data according to a first function of the determined bandwidth capacity if no congestion occurs, wherein the first function initially adjusts said sender rate non-linearly and then returns said sender rate to a linear rate when a predetermined percentage of said bandwidth is utilized within said network; and,
   (e) adjusting said sender rate of said source node according to a second function if congestion occurs.

2. The method of claim 1, wherein said adjusting step (d) according to said first function includes increasing the number of packets transmitted by said source node.

3. The method of claim 1, wherein said adjusting step (e) according to said second function includes decreasing the number of packets transmitted by said source node.

4. The method of claim 1, wherein said second function varies with said determined bandwidth capacity.

5. The method of claim 1, wherein the step (e) further comprises, in calculating said second function, calculating said sender rate raised to a power exceeding unity.

6. The method of claim 1, wherein the step (d) further comprises, in calculating said first function, calculating said sender rate raised to a power exceeding unity.

7. The method of claim 1, wherein said data flow from said source node is simultaneously transmitted to multiple destination nodes, and said bandwidth capacity is determined for each said data flow transmitted to each of said multiple destination nodes.

8. A method for providing congestion control in a communications network, the method comprising the steps of:
   (a) transmitting a plurality of serial data transmission from a source node to a destination node;
   (b) monitoring a sending rate at which said source node is currently transmitting data to said network and a current rate at which said destination node is currently receiving data to determine whether a congestion state occurs;
   (c) if no congestion state occurs, determining the bandwidth capacity of said network and increasing said sender rate of said source node according to a first function of the determined bandwidth capacity, wherein the first function initially adjusts said sender rate non-linearly and then returns said sender rate to a linear rate when a predetermined percentage of said bandwidth is utilized within said network; and,
   (d) if a congestion state occurs, decreasing said sender rate of said source node according to a second function.

9. The method of claim 8, wherein said second function varies with said determined bandwidth capacity.

10. The method of claim 8, wherein said decreasing further comprises, in calculating said second function, calculating said sender rate raised to a power exceeding unity.

11. The method of claim 8, wherein said increasing further comprises, in calculating said first function, calculating said sender rate raised to a power exceeding unity.

12. The method of claim 8, wherein said data flow from said source node is simultaneously transmitted to multiple destination nodes, and said bandwidth capacity is determined for each said data flow transmitted to each of said multiple destination nodes.

13. The method of claim 8, wherein a congestion state occurs if the rate permitted by said destination node exceeds the capacity of said source node.

14. The method of claim 8, wherein said steps of increasing and decreasing said sender rate above and below an operating point for said network provide a maximum throughput at minimum delay time.

15. The method of claim 8, wherein the step of decreasing said sender rate (fD $(x_i)$) according to said second function includes calculating the equations:

$$x_{i+1} = x_i - \beta x^l$$

and $$\beta = 1/mC^{l-1},$$

wherein $x_{i+1}$ represents a next sending rate of data; $x_i$ represents the current sending rate during cycle i; C represents the determined bandwidth capacity of said network, l represents a constant value greater than one; and, the value m ranges between $2 \leq m \leq 8$.

16. The method of claim 8, wherein the step of decreasing said sender rate according to said first function includes calculating the equations:

$$x_{i+1} = x_i + \alpha x^{-k} \quad \text{and} \quad \alpha = \frac{C^{k+1}}{D},$$

wherein $x_{i+1}$ represents a next sending rate of data; $x_i$ represents the current sending rate during cycle i; C represents the determined bandwidth capacity of said network, k represents a constant value less than negative one; and, the value D ranges between $5 \leq D \leq 20$.

17. A system for providing congestion control in a communications network by adjusting a sender rate between at least one sender node and destination node, comprising:
   a transmission module transmitting a plurality of data transmission from said source node to said destination node;
   a capacity module determining a bandwidth capacity of said network;
   a congestion module generating congestion feedback information based on the determined bandwidth capacity of said network to determine a congestion state; and,
   an adjustment module adjusting said sender rate at which said source node is currently transmitting the data based on said congestion feedback information, the adjusted rate being a function of said determined bandwidth capacity of said network, wherein the function initially adjusts said sender rate non-linearly and then returns said sender rate to a linear rate when a predetermined percentage of said bandwidth is utilized within said network.

18. The system of claim 17, further comprising a congestion feedback module utilizing said congestion feedback information to determine a congestion state in said network.

19. The system of claim 17, wherein said congestion module comprise a monitoring module monitoring said sending rate at which said source node is currently transmitting data to said network and a current rate at which said destination node is currently receiving data to generate said congestion control information.

20. A system for providing congestion control in a communications network by adjusting a sender rate between at least one sender node and destination node, comprising:
a transmission module for transmitting a plurality of data transmission from said source node to said destination node;
a capacity module for determining a bandwidth capacity of said network;
a congestion module for generating congestion feedback information based on the bandwidth capacity of said network to determine a congestion state; and,
an adjustment module for adjusting said sender rate at which said source node is currently transmitting the data based on said congestion feedback information, the bandwidth capacity of said network, wherein, if no congestion occurs, said adjusting means increase the number of packets transmitted by said source node initially at a non-linear rate and then at a linear rate if a predetermined range of the bandwidth capacity of said network is utilized.

21. The system of claim 17, wherein said adjustment module decreases the number of packets transmitted by said source node at a predetermined rate if congestion occurs.

22. The system of claim 17, wherein said adjustment module includes calculating, in evaluating said function, said sender rate raised to a power exceeding unity.

23. The system of claim 17, wherein said congestion feedback information is provided by at least one of said source node and said destination node.

24. A system for providing a congestion control in a communications network by adjusting the sender rate between a sender node and a destination node, comprising:
a memory for storing a computer-readable code; and,
a processor operatively coupled to said memory, said processor configured to:
(a) transmit a plurality of serial data transmissions from said source node to said destination node;
(b) determine whether a congestion state occurs in said network;
(c) determine a bandwidth capacity of said network;
(d) adjust said sender rate at which said source node is currently transmitting the data according to a first function of the determined bandwidth capacity if no congestion occurs, wherein the first function initially adjusts said sender rate non-linearly and then returns said sender rate to a linear rate when a predetermined percentage of said bandwidth is utilized within said network; and,
(e) adjust said sender rate of said source node according to a second function if congestion occurs.

25. The system of claim 24, wherein said adjusting step (d) according to said first function includes increasing the number of packets transmitted by said source node.

26. The system of claim 24, wherein said adjusting step (e) according to said second function includes decreasing the number of packets transmitted by said source node.

27. The system of claim 24, wherein said adjusting step (e) according to said second function varies with said determined bandwidth capacity.

28. The system of claim 24, wherein the step (e) further comprises calculating, in calculating said second function, said sender rate raised to a power exceeding unity.

29. The system of claim 24, wherein the step (d) further comprises calculating, in calculating said first function, said sender rate raised to a power exceeding unity.

30. A computer-readable medium having stored thereon data representing sequences of instructions, and the sequences of instructions which, when executed by a computer processor, cause the computer processor to:
transmit a plurality of serial data transmissions from a source node to a destination node;
monitor a sending rate at which said source node is currently transmitting data to said network and a current rate at which said destination node is currently receiving data to determine whether a congestion state occurs; if no congestion state occurs, determine the bandwidth capacity of said network and increase said sender rate of said source node according to a first function of the determined bandwidth capacity, wherein the first function initially adjusts said sender rate non-linearly and then returns said sender rate to a linear rate when a predetermined percentage of said bandwidth is utilized within said network; and,
if a congestion state occurs, decrease said sender rate of said source node according to a second function.

31. The computer-readable medium of claim 30, wherein said increase and decrease of said sender rate operate to establish a maximum data transmission rate and constant packet loss.

32. The computer-readable medium of claim 30, wherein the decreasing further comprises, in calculating said second function, calculating said sender rate raised to a power exceeding unity.

33. The computer-readable medium of claim 30, wherein said data flow from said source node is simultaneously transmitted to multiple destination nodes, and said bandwidth capacity is determined for each said data flow transmitted to each of said multiple destination nodes.

34. The computer-readable medium of claim 30, wherein the increasing further comprises, in calculating said first function, calculating said sender rate raised to a power exceeding unity.

35. The computer-readable medium of claim 30, wherein the step of decreasing said sender rate ($f_D(x_i)$) according to said second function includes calculating the equations:

$$x_{i+1} = x_i - \beta x^l$$

and $$\beta = 1/mC^{l-1},$$

wherein $x_{i+1}$ represents a next sending rate of data; $x_i$ represents the current sending rate during cycle i; C represents the determined bandwidth capacity of said network, l represents a constant value greater than one; and, the value m ranges between $2 \leq m \leq 8$.

36. The computer-readable medium of claim 30, wherein the step of decreasing said sender rate according to said first function includes calculating the equation:

$$x_{i+1} = x_i + \alpha x^{-k} \text{ and } \alpha = \frac{C^{k+1}}{D},$$

wherein $x_{i+1}$ represents a next sending rate of data; $x_i$ represents the current sending rate during cycle i; C represents the determined bandwidth capacity of said network, k represents a constant value less than negative one; and, the value D ranges between $5 \leq D \leq 20$.

37. A congestion controller disposed at a source node for a network, said source node being configured for currently transmitting the data toward a destination node at a sender rate that is controlled by said controller, and that is dictated by a first function of a currently determined bandwidth capacity of said network if it is determined that no congestion is occurring in said network, wherein the first function initially adjusts said sender rate non-linearly and then returns said sender rate to a linear rate when a predetermined percentage of said bandwidth is utilized within said network, said controller being configured for adjusting a rate for currently transmitting said data toward said destination node according to a second function if the determination is that congestion is occurring in said network.

* * * * *